United States Patent
Yeh (10) Patent No.: US 6,343,406 B1
(45) Date of Patent: Feb. 5, 2002

(54) HINGE ON LADDER

(76) Inventor: Tom Yeh, 57 Wu-hsun Street, Keelung (TW)

(*) Notice: Subject to any disclaimer, the term of this patent is extended or adjusted under 35 U.S.C. 154(b) by 0 days.

(21) Appl. No.: 09/639,258

(22) Filed: Aug. 15, 2000

(51) Int. Cl.[7] ............................................... E05D 11/10
(52) U.S. Cl. ........................... 16/328; 182/163; 403/93
(58) Field of Search ........................... 16/328, 331, 332, 16/334, 326, 327, 353; 182/163, 22; 403/83, 84, 85, 92, 93, 94, 95, 96, 97, 99

(56) References Cited

U.S. PATENT DOCUMENTS

| | | | | |
|---|---|---|---|---|
| 4,403,373 A | * | 9/1983 | Kummerlin | 16/328 |
| 4,407,045 A | * | 10/1983 | Boothe | 16/327 |
| 4,566,150 A | * | 1/1986 | Boothe | 16/332 |
| 4,697,305 A | * | 10/1987 | Boothe | 16/331 |
| 4,773,503 A | * | 9/1988 | Purkapile | 182/22 |
| 4,890,950 A | * | 1/1990 | Yoo | 16/328 |
| 5,353,892 A | * | 10/1994 | Lu | 16/328 |
| 5,620,272 A | * | 4/1997 | Sheng | 182/163 |
| 5,954,157 A | * | 9/1999 | Grimes et al. | 182/163 |
| 5,992,566 A | * | 11/1999 | Yeh | 16/332 |

* cited by examiner

Primary Examiner—Lynne H. Browne
Assistant Examiner—Doug Hutton
(74) Attorney, Agent, or Firm—Connolly Bove Lodge & Hutz LLP (57) ABSTRACT

A hinge on a ladder comprises outer casing pair, inner casing pair, a fixing plate with a shaft and three lock pins, a central rivet pin, and a button knob. The outer casing pair and the inner casing pair are pivotally engaged to each other in such a way that the circular plate portions on the casing pairs facially contact with one another. When the locating holes on the outer casing pair align with three specific ones of nine locating holes on the inner casing pair, the three lock pins are pushed toward the outer casing pair and to pass through the aligned locating holes and perform a locking position. When the button knob is pressed toward the outer casing pair against the restoring force of the spring, the three lock pins move away the locating holes. Therefore, the elongated projection ends of the three lock pins fit with the elongated slots on a half piece of outer casing pair to perform an unlocked position.

1 Claim, 8 Drawing Sheets

Fig. 8 ary patent published number 282057 discloses a
HINGE ON LADDER

BACKGROUND OF THE INVENTION

1. Field of the Invention

The present invention relates to a hinge used on a ladder, and particularly to a hinge on an articulated ladder with which a lock mechanism are provided with three lock pins and specific lock holes to perform different lock position respectively.

2. Description of Related Art

It is known that many types of hinges have been developed and used on an articulated metal ladder. For instance, Taiwanese patent published number 282057 discloses a ladder hinge which provides a lock mechanism being operated by way of a trigger pressing slide pins under restoring forces of springs. Furthermore, U.S. Pat. No. 4,566,150 discloses a ladder hinge having a lock mechanism being operated by way of a pair of locking pins transversely passing through two of four apertures on support plats. However, the prior art hinges are sophisticate in structure and inconvenient in operation.

SUMMARY OF THE INVENTION

An object of the present invention is to provide a ladder hinge in which three locking pins are located radially and spaced apart to each other to pass through engaging holes specifically distributing on casings of the hinge radially for performing different lock positions respectively.

Another object of the present invention is to provide a ladder hinge, which offers a locking mechanism having fewer parts to simplify the required procedure of assembly.

A further object of the present invention is to provide a ladder hinge, which offers each lock position thereof a sufficient stability and safety.

A further object of the present invention is to provide a ladder hinge with which each lock position can be obtained easily and conveniently.

BRIEF DESCRIPTION OF THE DRAWINGS

The present invention can be more fully understood by referring to the following description and accompanying drawings, in which.

DETAILED DESCRIPTION OF THE PREFERRED EMBODIMENT

Figure 1:
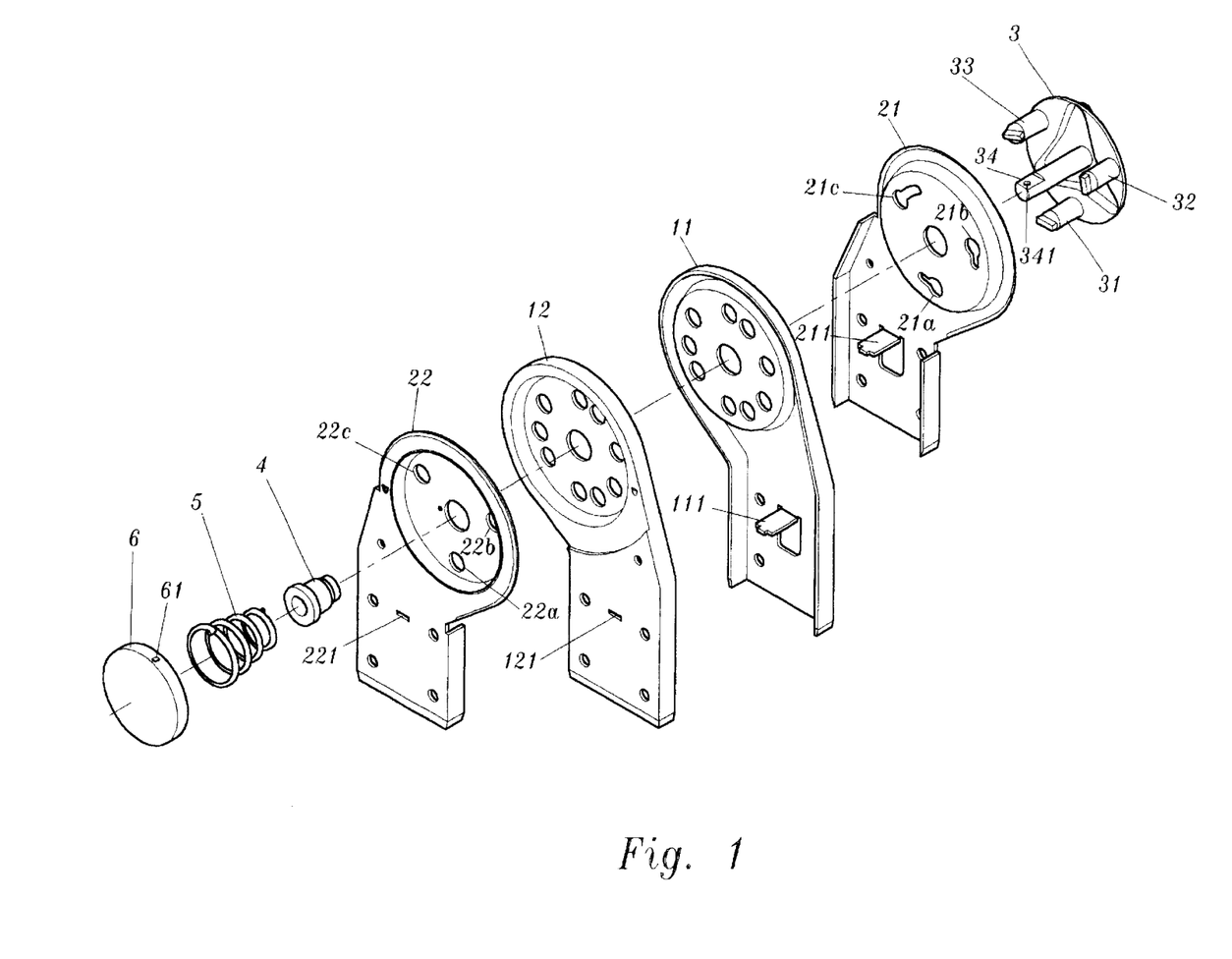
FIG. 1 is an exploded perspective view of a ladder hinge according to the present invention.
Figure 2:
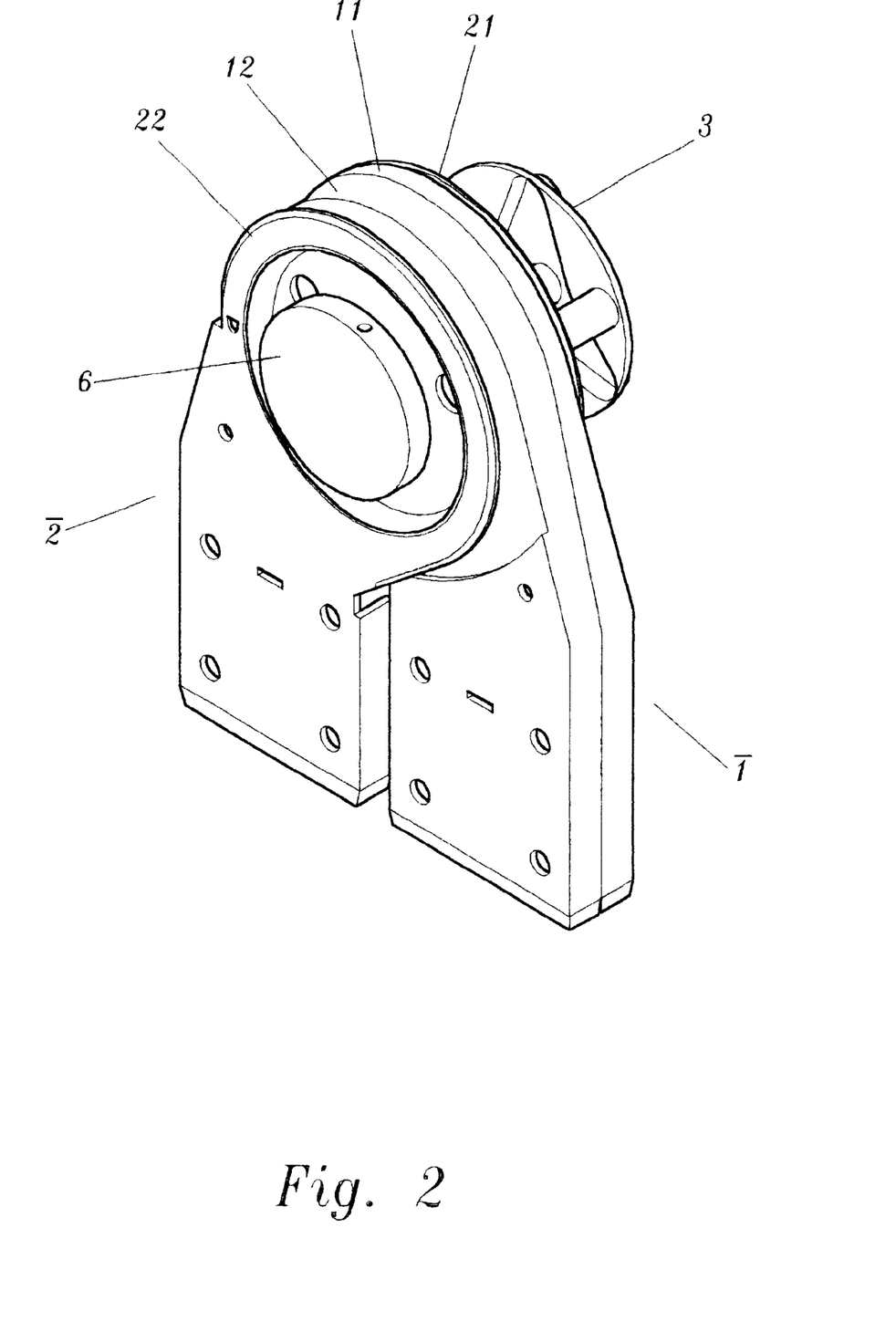
FIG. 2 is an assembled perspective view of the ladder hinge shown in FIG. 1.

Referring to FIG. 1 and FIG. 2, a ladder hinge according to the present invention is basically comprised of inner casing pair 1, outer casing pair 2, a fixing plate 3 with lock pins, a central pin rivet 4, a button knob 6, and a spring 5. As the prior art does, the inner casing pair is composed of a right inner casing half 11 and a left inner casing half 12 being fixedly attached to each other oppositely. The right inner casing half 11 at the lower part thereof has a locating tongue 111 extending leftward transversely and the left inner casing half 12 at the lower part thereof has a slot 121 corresponding to the locating tongue 111. Hence, the right inner casing half 11 and the left inner casing half 12 can be joined to each other by way of the free end of the locating tongue 111 fitting with the slot 121. The outer casing pair 2 is composed of a right outer casing half 21 and a left outer casing half 22 being fixedly attached to each other oppositely. Similarly, the right outer casing half 21 at the lower part thereof has a locating tongue 211 extending leftward transversely and the left outer casing half 22 at the lower part thereof has a slot 221 corresponding to the locating tongue 211. Hence, the right outer casing half 21 and the left outer casing half 22 can be joined to each other by way of the free end of the locating tongue 211 fitting with the slot 221. The inner casing pair 1 and the outer casing pair 2 have about the same configuration respectively as the prior art does. Therefore, the inner casing halves 11, 12 have a circular upper plate portion and a rectangular lower portion extending tangentially and downward from the circular upper plate respectively. The circular plate portions on the inner casing halves 11, 12 contact with each other facially and nine locating through holes spacing apart to each other respectively. Also, the nine locating holes on the respective inner casing halves 11, 12 are disposed radially to correspond to and align with each other. The rectangular lower portions on the inner casing halves 11, 12 are provided with fixing holes to align with each other for being fastened to one of rails of a ladders by way of rivets. The circular plate portions on the outer casing halves 21, 22 are positioned to have a gap in between for being inserted the circular plate portions on the inner casing halves 11, 12. In this way, the circular plate portion on the right outer casing 21 is facially attached to the circular plate portion on the right inner casing half 11. In the mean time, the circular plate portion on the left outer casing half 22 is facially attached to the circular plate portion on the left inner casing half 12. Furthermore, the right outer casing half 21 has three locating through holes 21a, 21b, and 21c being disposed radially such that the locating holes 21a, 21b, 21c are spacing apart to one another. An angular distance between any two of locating holes 21a, 21b, 21c is specifically arranged, that is, angular distances between locating holes 21a and 21b, between locating holes 21a and 21c, and between locating holes 21b and 21c are specified purposely. Hence, it is not necessary that these three angular distances have to be the same. The left outer casing half 22 also has three locating through holes 22a, 22b, and 22c radially spacing apart specifically either to correspond to the locating through holes 21a, 21b, and 21c respectively. The rectangular lower portions on the outer casing halves 21, 22 are provided with fixing holes respectively for being fastened to another rail of the ladder. An axial hole is provided at the centers of the circular plate portions on the inner casing halves 11, 12 and the outer casing halves 21, 22. The central pin rivet 4 is hollow and passes through the axial hole and is pivotally fixed therein to assure the circular plate portions on the inner casing halves 11, 12 and the outer casing halves 21, 22 in a state of facial contact. Furthermore, the central pin rivet 4 allows the inner casing pair 1 and the outer casing pair 2 to move relatively to each other. The fixing plate 3 is circular and the major part of the fixing plate 3 provides a triangular projection for being held by the hand while in operation. A shaft 34 at an end thereof is fixed to the center of the fixing plate 3 and extends axially to pass through the central pin rivet 4. Three lock pins 31, 32, 33 are disposed to space apart circularly and in parallel with respect to the shaft 34. Furthermore, the lock pins 31, 32, 33 fix to the fixing plate 3 to corresponding the locating holes 21a, 21b, 21c and 22a, 22b, 22c respectively on the outer casing halves 21, 22. The shaft 34 at the other end thereof is provided with an engaging hole 341 for engaging with the button knob. The button knob 6 has a shape of disk and a lateral side facing the left outer casing half 22 has a central bore and annular grooves (not shown in the figures). The center bore fits with the free end of the shaft 34 and the annular grooves receive the left end of the spring 5. An engaging hole 61 is provided to across the circumferential edge on the button knob 6 aligning with the engaging hole 341 so as to be passed through by a locating pin for engaging with the shaft 34. The spring 5 is a compression spring and has a shape of cone with a large end and a small end respectively. Both ends of the spring 5 are provided with a hook end respectively to engage with the button knob 6 and the left outer casing half 22. The resilient restoring force of spring 5 assures the locking function provided by the ladder hinge.

Figure 3:
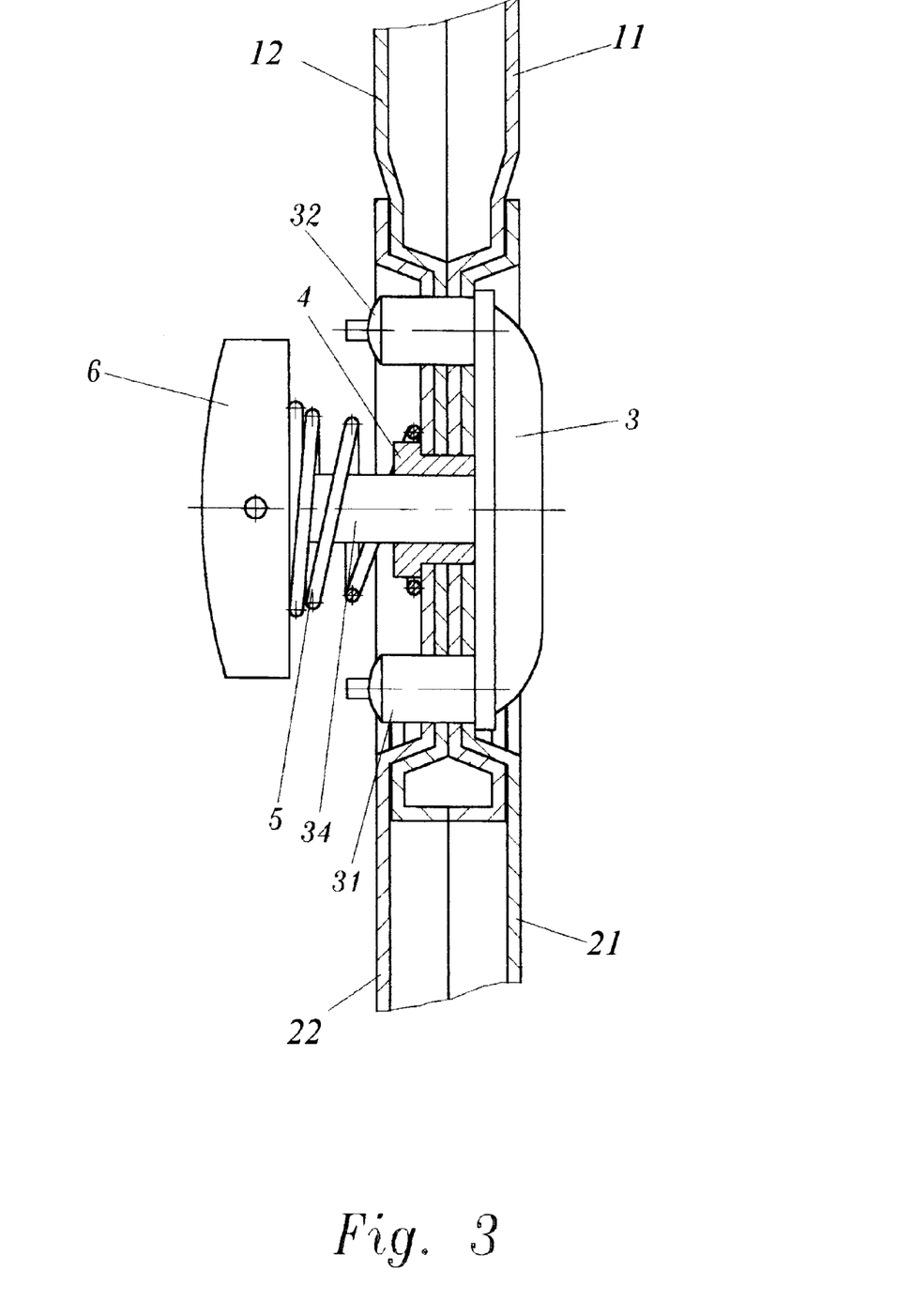
FIG. 3 is a partial sectional view of the ladder hinge shown in FIG. 2 illustrating the hinge in a state of a lock position.

Referring to FIG. 3 with referencing FIG. 1 again, the ladder hinge is in a state of locking. As shown in FIG. 3, the fixing plate 3 is pushed leftward to close to the right outer casing half 21. Meanwhile, the lock pins 31, 32, 33 pass through the locating holes 21a, 21b, 21c on the right outer casing half 21, three of nine locating holes on the inner casing halves 11, 12 respectively, and the three locating holes 22a, 22b, 22c on the left outer casing half 22. Moreover, the shaft 34 moves leftward to result in the button knob 6 is away the left outer casing half 22.

Figure 4:
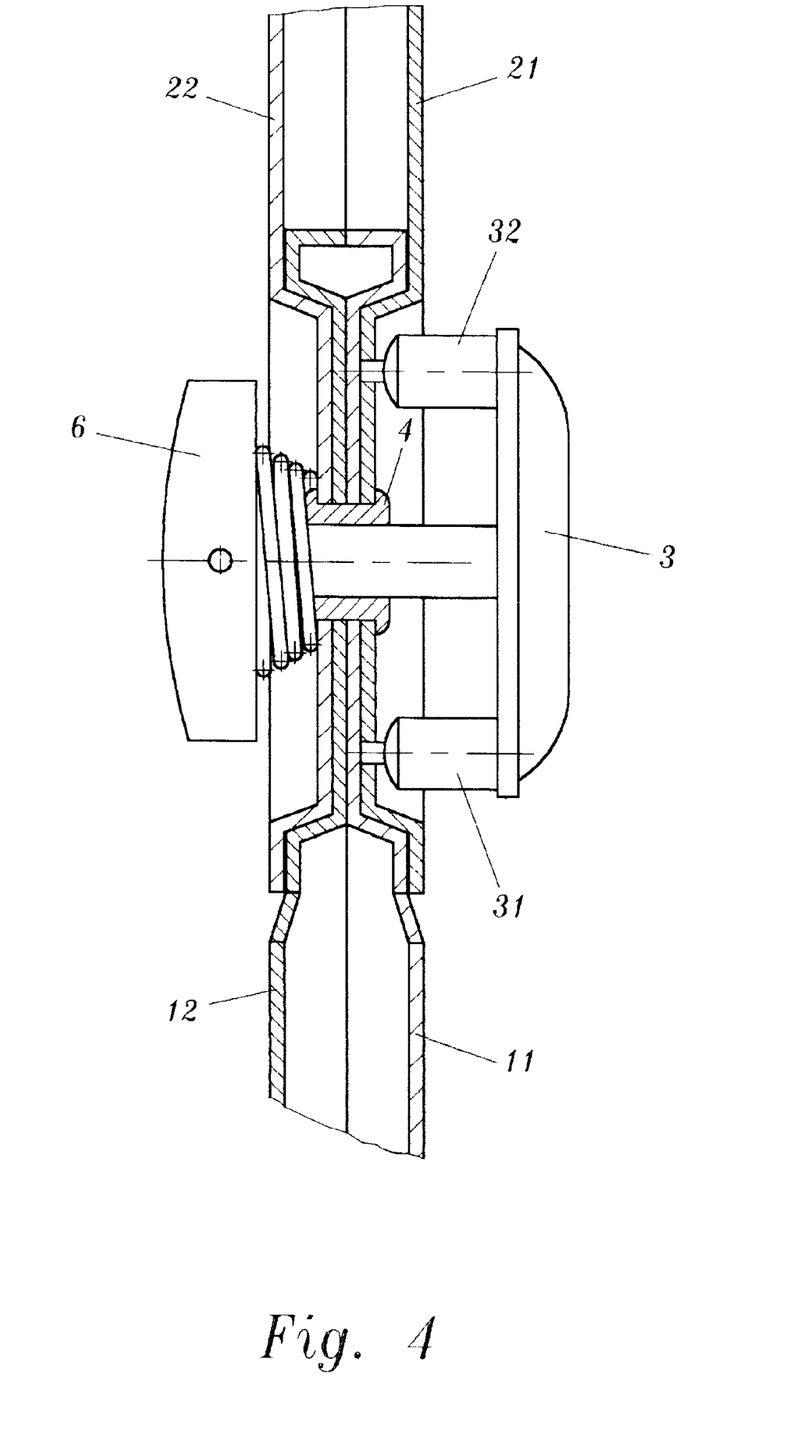
FIG. 4 is a partial sectional view of the ladder hinge shown in FIG. 2 illustrating the hinge in a state of an unlocked position.

Referring to FIG. 4 with referencing FIG. 1 again, the ladder hinge is in a state of unlocking. The button knob 6 is pushed toward the left outer casing half 22 against the restoring force of the spring 5 such that the fixing plate 3 is moved away the right outer casing half 21. Thus, the free end of the respective lock pin 31, 32, 33 retained at the right outer casing half 21, that is, the locating holes on the inner casing halves 11, 12 are not passed through by the lock pins 31, 32, 33. As shown in FIG. 1, the three locating holes 21a, 21b, 21c on the right outer casing half 21 respectively extend an elongated slot laterally. The slot has a width smaller than the diameter of respective locating hole 21a, 21b, 21c. The three lock pins 31, 32, 33 have an elongated projection respectively at free ends thereof to correspond to the respective elongated slot. Hence, the elongated projections on the lock pins 31, 32, 32 may engage with the elongated slots by way of the torsion of the spring 5 such that the lock pins 31, 32, 33 are in a state of unlocking.

In practice, the ladder hinge of the present invention is provided with four different locking positions and further details will be described hereinafter with illustration in FIGS. 5, 6, 7, and 8 respectively. It is noted that "a", "b", "c", "d", "e", "f", "g", "h", and "i" in FIGS. 5, 6, 7, 8 are designated nine locating holes on the inner casing halves 11, 12 shown in FIG. 1. As for the angular distances between locating holes "a" and "b", "b" and "c", "c" and "d", "d" and "e", "e" and "f", "f" and "e", "e" and "h", and "h" and "i", 40°, 30°, 40°, 40°, 30°, 40°, 30°, and 40° are set, respectively in the preferred embodiment. In addition, the angular distances between locating holes 22a and 22b (or 21a and 21b), 22a and 22c (or 21a and 21c) are set 110° respectively. It has to be understood that the angular distances set are for taking examples only and not for restriction. Also, it has to mention in advance that FIGS. 5, 6, 7, and 8 are viewed facing the left outer casing half 22.

Figure 5:
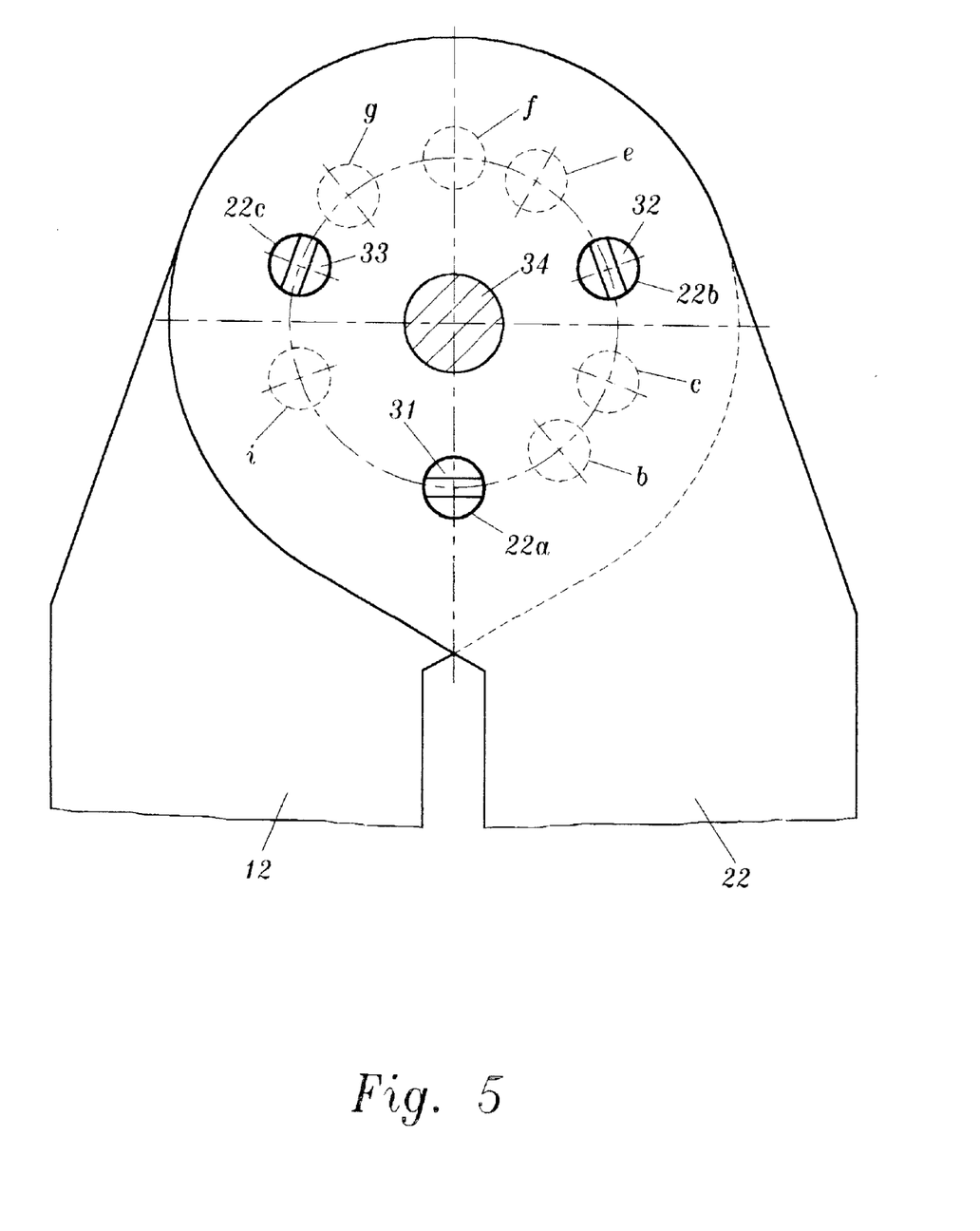
FIG. 5 is a diagrammatic view illustrating the hinge in a state of lock position of being folded.

Referring to FIG. 5, a first locking position of the hinge is illustrated to show two rails of the ladder engaging with the hinge is in a state of folding. Nine locating holes "a", "b", "c", "d", "e", "f", "g", "h", and "i" respectively on the inner casing halves 11, 12 (the inner casing 12 is shown in FIG. 5 only) are disposed to correspond to the locating holes 21a, 21b, 21c on the right outer casing half 21 and the locating holes 22a, 22b, 22c on the left outer casing half 22 (the left outer casing half 22 shown in FIG. 5 only). As shown in FIG. 5, the locating holes 22a, 22b, 22c align with the locating holes "a", "d", and "h" (not indicated) and the lock pins 31, 32, 33 fit with the aligned locating holes to form the first locking position and the ladder is in a state of folding.

Figure 6:
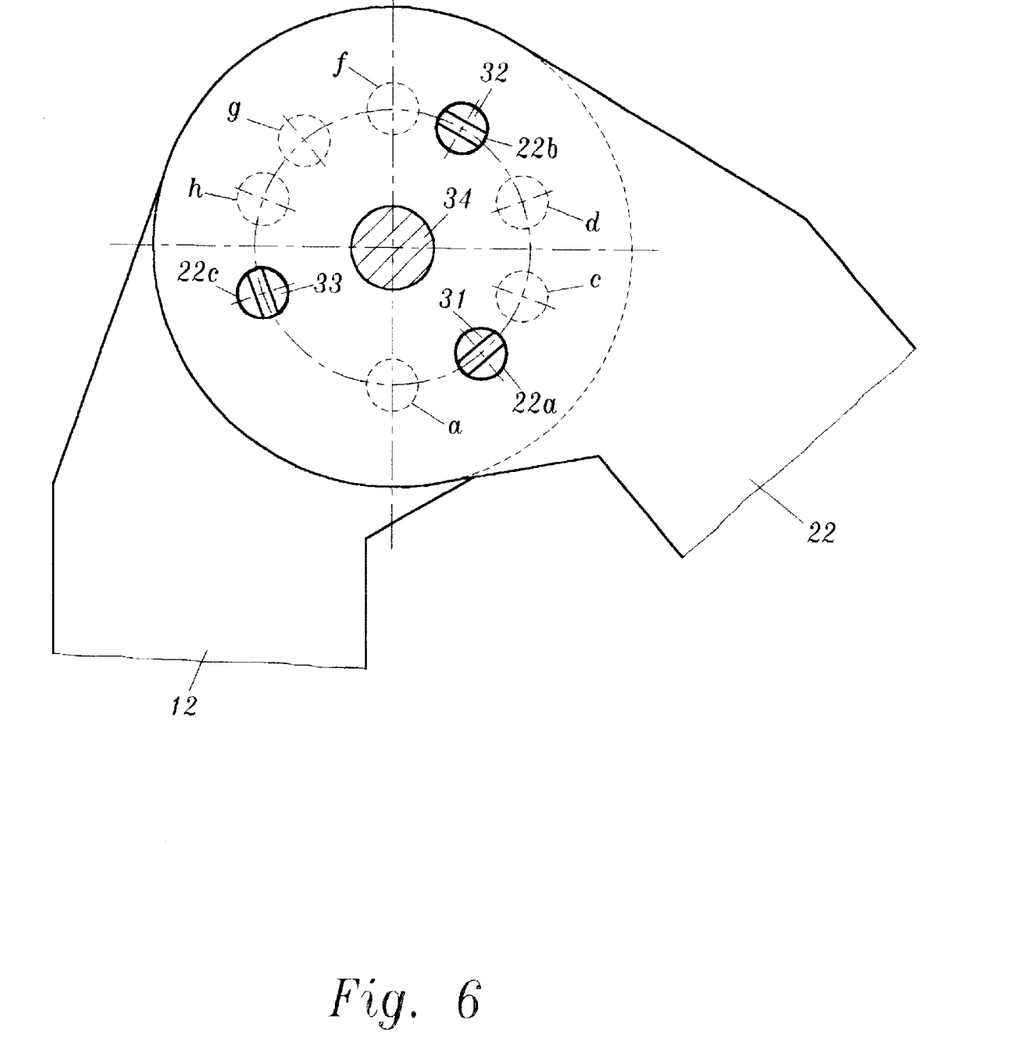
FIG. 6 is a diagrammatic view illustrating the hinge in a state of another lock position of being opened an acute angle for forming a stepladder.

Referring to FIG. 6 with referencing FIG. 2, a second locking position of the hinge is illustrated to show the rails of the ladder engaging with the hinge is in a state of opening an acute angle. Of course, the lock pins 31, 32, 33 have to pushed back to an unlocking state as shown in FIG. 4 before performing the second locking position. When the rails are opened to turn the inner casing 1 and the outer casing 2 relatively, the locating holes "b", "e", "i" may align with the locating holes 22a, 22b, 22c and the button knob 6 is turned against the restoring force of the spring 5 to move the respective elongated projection on the lock pins 31, 32, 33 away the respective elongated slot at the same time. Thus, the lock pins 31, 32, 33 may enter and pass through the aligned locating holes by way of the restoring force of the spring to form the second locking position and the ladder is in a state of stepladder.

Figure 7:
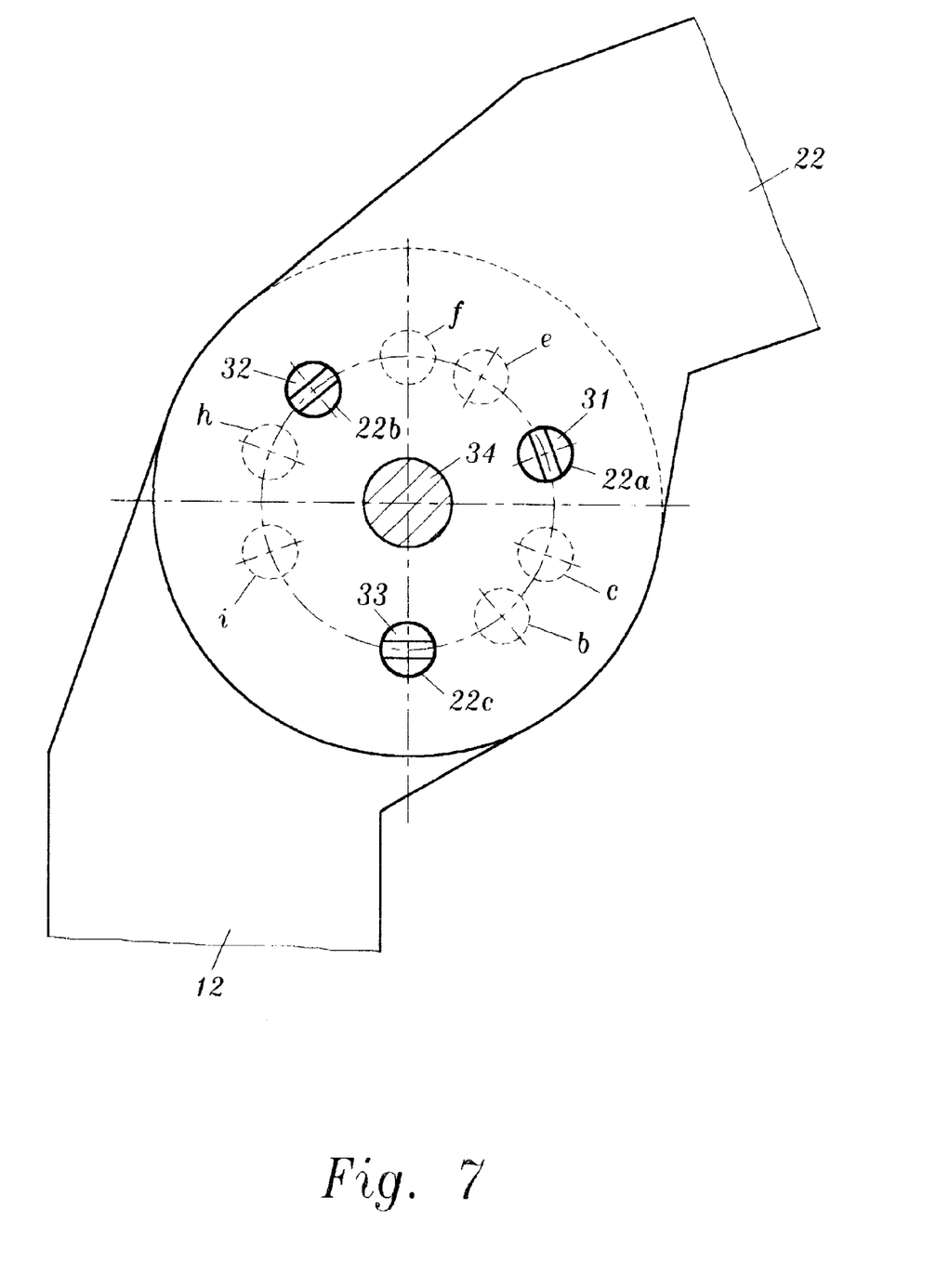
FIG. 7 is a diagrammatic view illustrating the hinge in a state of further lock position of being opened an obtuse angle for forming a scaffold.

Referring to FIG. 7 with referencing FIG. 2, a third locking position of the hinge is illustrated to show the rails of the ladder engaging with the hinge is in a state of opening an obtuse angle. The operation of the third locking position is similar to the illustration of FIG. 6. Once the inner casing 1 and the outer casing 2 are turned away further relative to each other to allow the locating holes d, g, and a aligning with the locating holes 22a, 22b, 22c respectively. Meanwhile, the button knob 6 is turned again to urge the lock pins 31, 32, 33 entering and passing through the aligned locating holes so as to form the third locking position and the ladder is in a state of scaffold.

Figure 8:
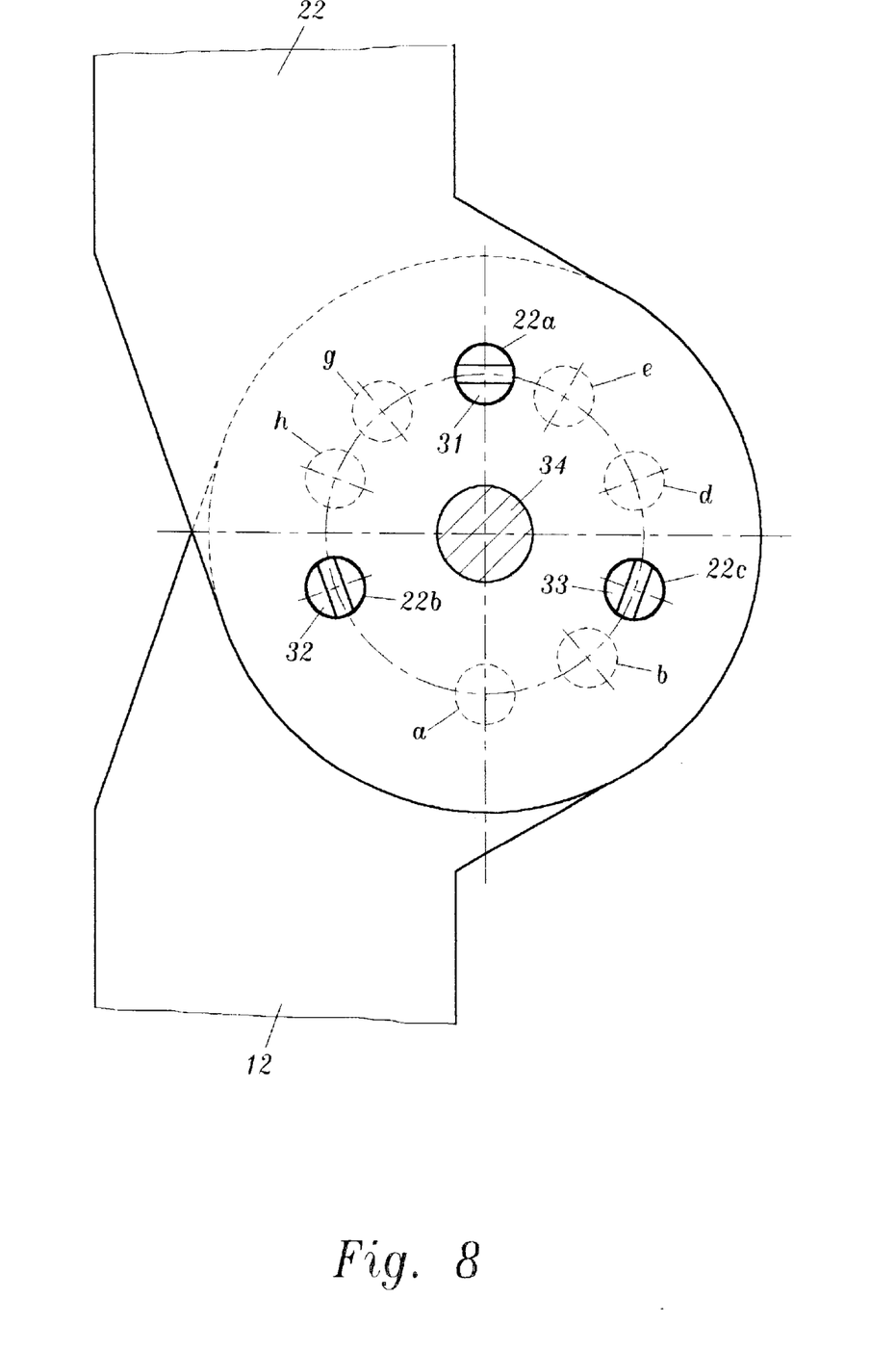
FIG. 8 is a diagrammatic view illustrating the hinge in a state of further lock position of being opened an angle of 180° for forming a straight ladder.

Referring to FIG. 8 with referencing FIG. 2, a fourth locking position of the hinge is illustrated to show the rails of the ladder engaging with the hinge is in a state of opening an angle of 180°. Similarly, the inner casing 1 and the outer casing 2 are moved away further to each other relatively to result in the locating holes f, i, and c align with the locating holes 22a, 22b, 22c respectively. In the meantime, the button knob 6 is turned again to urge the lock pins 31, 32, 33 entering and passing through the aligned locating holes to form the fourth locking position and the ladder is in a state of straight ladder.

Moreover, it can be understood that the operation of above said four locking positions are stated sequentially. But, it is noted that it is possible to perform any required locking position from any other three locking positions by way of the operation described above.

It is appreciated that the three lock pins and specified locating holes on the inner casing and outer casing associating with the operation of the button knob against the restoring force of spring makes the ladder hinge of the present invention easily perform locking positions. Accordingly, a ladder can be arranged to form different ladder types as required.

While the present invention has been described with reference to a preferred embodiment thereof, it is to be understood that modifications and variations may be easily made without departing from the spirit of this invention, which is defined by the appended claims.

What is claimed is:

1. A hinge on a ladder, comprising:

outer casing pair, said outer casing pair further comprising a first and a second outer casing halves fixedly attached to each other oppositely, the outer casing halves having an upper circular plate portion and a lower rectangular plate portion, the respective upper circular plate portion being radially disposed with three specified locating holes, the locating holes on the first outer casing half aligning with the locating holes on the second outer casing half, each of the locating holes on the first outer casing half extending an elongated slot laterally, and a gap being between the upper circular plate portions of the outer casing halves;

inner casing pair, said inner casing pair further comprising a first and a second inner casing halves fixedly attached to each other oppositely, said inner casing halves having an upper circular plate portion and a lower rectangular plate portion respectively, the upper circular plate portions facially contacting with each other, being received in said gap on the outer casing halves and providing nine spacing apart locating holes radially, and the locating holes on the first inner casing half aligning with the same on the second inner casing half;

a central pin rivet, having an axial through hole therein, passing through and fixing to all the upper circular plate portions such that the outer casing pair and the inner casing pair can be pivotally moved relatively;

a shaft with two ends, passing through the axial through hole in the central pin rivet with one of the ends thereof;

a fixing plate, having a center part being fixedly attached by the other end of the shaft;

three lock pins, being disposed on the fixing plate spacing apart to each other and aligning with the locating holes on the outer casing pair, each of the lock pins having two ends, one of the ends fixed to the fixing plate and the other one of the ends being an elongated projection;

a button knob, being a shape of disk, having a central inner bore to be fixed to the other one of the ends on the shaft; and a spring with two hook ends, being disposed between the button knob and the second outer casing half, and said two hook ends engaging with the button knob and the second outer casing half respectively;

Whereby, while the outer casing pair and the inner casing pair are pivotally moved relatively and the locating holes on the outer casing pair align with three specific ones of the locating holes on the inner casing pair, the fixing plate with the three lock pins and the shaft is pressed toward the first outer casing half and the three lock pins pass through the aligned locating holes to perform a locking position; and while the button knob is pushed toward the second outer casing half against the restoring force of the spring, the three lock pins move away the locating holes and the elongated projection ends of the three lock pins fit with the elongated slots on the outer casing half to perform an unlocked position.

* * * * *